United States Patent
Willets et al.

(10) Patent No.: US 7,352,578 B2
(45) Date of Patent: Apr. 1, 2008

(54) FUEL CELL SYSTEM WITH INVERTER AND PHASE CHANGE MATERIAL

(75) Inventors: Julie A. Willets, Overland Park, KS (US); Gerald D. Meyers, Olathe, KS (US); Larry L. Johnson, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 235 days.

(21) Appl. No.: 11/224,614

(22) Filed: Sep. 12, 2005

(65) Prior Publication Data
US 2007/0058348 A1    Mar. 15, 2007

(51) Int. Cl.
*H05K 7/20* (2006.01)
*H02J 7/00* (2006.01)

(52) U.S. Cl. .................... 361/700; 307/64; 307/65; 307/66

(58) Field of Classification Search ............. 361/700
See application file for complete search history.

(56) References Cited

U.S. PATENT DOCUMENTS

| | | | |
|---|---|---|---|
| 4,425,998 A | 1/1984 | Hof et al. | |
| 5,224,356 A * | 7/1993 | Colvin et al. | 62/259.2 |
| 5,929,538 A | 7/1999 | O'Sullivan et al. | |
| 6,011,324 A | 1/2000 | Kohlstruck et al. | |
| 6,169,247 B1 * | 1/2001 | Craft et al. | 174/15.1 |
| 6,184,593 B1 | 2/2001 | Jungreis | |
| 6,205,022 B1 * | 3/2001 | Bhatia et al. | 361/687 |
| 6,239,502 B1 * | 5/2001 | Grewe et al. | 290/1 B |
| 6,304,006 B1 | 10/2001 | Jungreis | |
| 6,317,321 B1 * | 11/2001 | Fitch et al. | 361/700 |
| 6,371,321 B1 * | 4/2002 | Lee | 220/23.4 |
| 6,417,577 B1 * | 7/2002 | Grewe et al. | 290/40 C |
| 6,418,017 B1 * | 7/2002 | Patel et al. | 361/700 |
| 6,621,702 B2 * | 9/2003 | Elias et al. | 361/700 |
| 7,002,800 B2 * | 2/2006 | Elias et al. | 361/700 |
| 7,227,749 B2 * | 6/2007 | Rockenfeller | 361/688 |

OTHER PUBLICATIONS

Voigt, W. and D. Zeng, "Solid-liquid equilibria in mixtures of molten salt hydrates for the design of heat storage materials," Pure Appl. Chem., vol. 74, No. 10, pp. 1909-1920, 2002. (PCM only).
Marongiu, Maurice J. and Randy Clarksean, "Thermal management of outdoor enclosures using phase change materials," Electronics Cooling, Flomerics—Jan. 1998—Article2.htm, http://www.electronics-cooling.com/Resources/EC_Articles/JAN98/article2.htm (PCM only).

* cited by examiner

Primary Examiner—Gregory D Thompson

(57) ABSTRACT

The present invention is a back-up power supply of alternating current and direct current, with the alternating current being generated by an inverter from the direct current, which is produced by a fuel cell. The inverter is at least partially encompassed by a phase changing material having an elevated melting point such that the phase changing material absorbs heat generated by the inverter as well as in the surrounding air, thereby maintaining the inverter temperature within acceptable limits. As the phase changing material absorbs the heat, its temperature rises and melts. Upon cooling of the system, the phase change material re-solidifies.

12 Claims, 3 Drawing Sheets

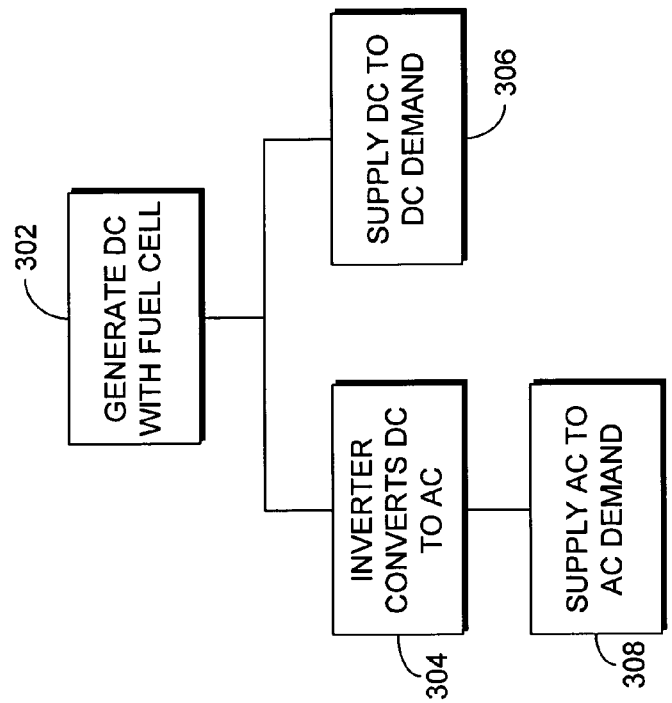
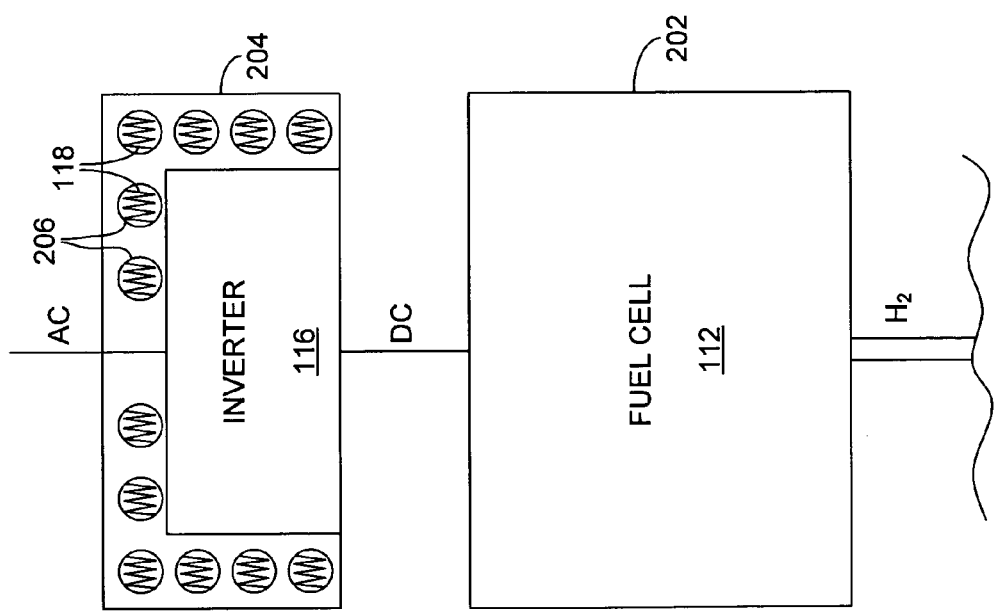

FUEL CELL SYSTEM WITH INVERTER AND PHASE CHANGE MATERIAL

CROSS-REFERENCE TO RELATED APPLICATIONS

None.

STATEMENT REGARDING FEDERALLY SPONSORED RESEARCH OR DEVELOPMENT

None.

FIELD OF THE INVENTION

In general, this invention is a back-up power supply system. More specifically, this invention relates to the field of providing both direct current and alternating current power back-up for a telecommunications facility.

BACKGROUND OF THE INVENTION

Traditionally, commercial power from a utility has been used as the primary source of electrical power for a consuming entity, such as a telecommunications facility. Many power systems include backup power sources to deliver power in the event that the utility is unable to deliver power. Black-outs and other disturbances in the commercial power grid make this necessary.

To provide back-up, many facilities use an array of batteries. Operationally, if power from the commercial utility is lost, the battery array provides power during the time the commercial utility is out until the battery array is exhausted.

Prior power back-up systems would provide sufficient direct current (DC) back-up for the facility, but there is also a demand for supplying small amounts of alternating current (AC) back-up power to low load devices. Examples of these low load devices include facility lights, instrumentation, and cellular tower lights, which must be operational during power outages for safety purposes. Present battery back-up power systems for telecommunications facilities do not provide these lower AC power requirements.

SUMMARY OF THE INVENTION

The present invention provides an apparatus and method for providing back-up direct current (DC) power as well as low load alternating current (AC) back-up power. The back-up AC power is provided from an inverter that receives a portion of DC output from a back-up DC generating device, which is preferably a fuel cell. In operation, the inverter heats up and due to the limited operating temperatures that an inverter can be exposed to, the inverter in this back-up system is enveloped in a phase changing material (PCM) having a high melting point, such that when temperatures reach this point, the state change causes an endothermic reaction where heat produced by the inverter is absorbed into the PCM, permitting the inverter to operate at higher outdoor temperatures. Later, after the inverter and surrounding air cools, heat is dissipated from the material, and it returns to a solid state. The AC power supplied by the inverter is directed to an AC demand such as illumination and instrumentation requirements of a wireless telecommunications site, while the remaining DC is directed to a DC demand.

BRIEF DESCRIPTION OF THE DRAWINGS

The present invention is described in detail below with reference to the attached drawing figures, wherein:

FIG. 2 is a schematic drawing showing more detailed aspects of one embodiment of the present invention.

FIG. 3 is a flow diagram showing the split of DC power from the back-up source in accordance with the present invention.

DETAILED DESCRIPTION OF THE INVENTION

The present invention, a back-up power source of direct current (DC), comprises a source of DC and an inverter to convert a portion of the DC to AC with the inverter at least partially encompassed with a material designed to absorb heat emitted from the inverter as well as to absorb heat from the surrounding air. This invention will best be understood in connection with (i) the schematic diagrams of FIGS. 1 and 2, and (ii) the flow charts of FIGS. 3 and 4.

Figure 1:
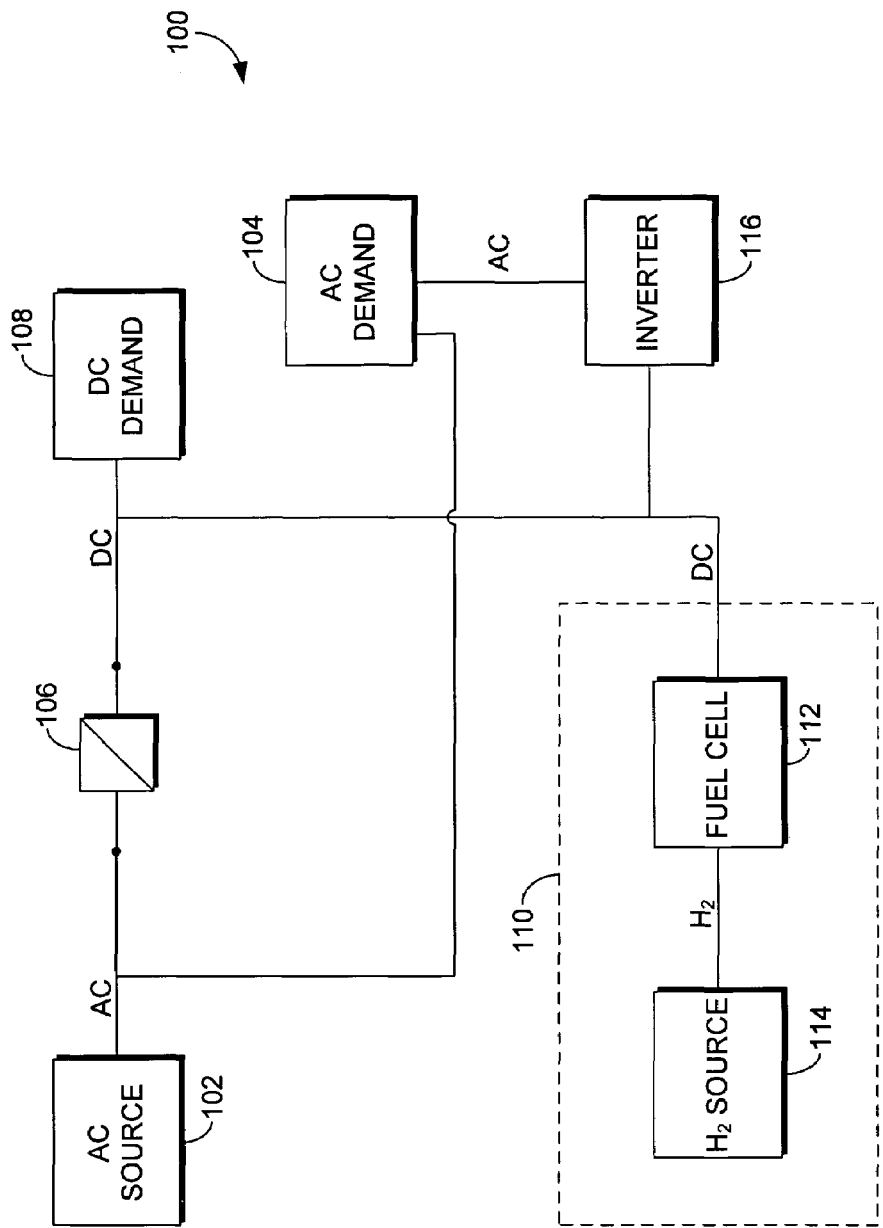
FIG. 1 is a schematic drawing showing one embodiment of the overall system of the present invention.

Referring to FIG. 1, a site 100 is provided at which the present invention is incorporated. Site 100 comprises an AC source 102 that provides AC power to an AC demand 104 and to a means for converting AC to DC, which is preferably a rectifier 106. Although only one rectifier 106 is shown in FIG. 1, depending on the amount of DC required, more than one rectifier 106 may be utilized.

Output from rectifier 106 is directed to a DC demand 108. Although site 100 can be any location having an AC and DC demand, one application for the present invention is a site for providing transmission of communication signals across a network, such as a wireless telecommunications station. At this type of site, various amounts of AC and DC power are required. For example, at a typical wireless telecommunications station, the AC source, which is often a utility, provides power to the station, from which a majority of it is converted to DC to supply the base transceiver station (BTS). Other equipment at the site, such as lighting for the transmission tower and instrument panels operate from AC power. This requirement is met by the AC utility when operational. However, should AC source 102 not be available, AC demand 104 and DC demand 108 at the site still exist, and must be fulfilled by a back-up source. In the past, typically only DC power was supplied as a back-up, leaving the AC demand unfulfilled.

To fulfill both requirements, a back-up power source 110 is utilized which comprises a source of DC 112, which is preferably a fuel cell. An inverter 116 is connected to the source of DC 112 for converting a portion of DC from source 112 (fuel cell) to AC. As one skilled in the art of fuel cell technology will understand, fuel cells are basically electrochemical energy conversion devices. That is, they utilize hydrogen and oxygen to create electricity. Fuel cells have a proton exchange member (or other equivalent device) to temporarily remove the electron from hydrogen. Later this hydrogen electron is returned when the hydrogen is combined with oxygen. The reaction is non-combustive and environmentally friendly with the only by products being heat and water, as DC electrical power is produced. Furthermore, as long as hydrogen is available to the fuel cell, DC power can be generated. The fuel cell is not like a battery that discharges over time. The hydrogen required for fuel cell 112 is supplied from a stored hydrogen source 114. Therefore, DC power requirements are met by output from fuel cell 112 and the local AC power requirements, such as tower lighting and instrumentation, are met by AC output generated by inverter 116.

As one skilled in the art will understand, inverters change DC voltage into AC voltage and in the process, generate heat. Depending on the location of inverter 116, it may be exposed to surrounding ambient air that is at an elevated temperature. Inverters, however, are generally designed to operate in climate controlled locations and have limited temperature ranges in which they can operate without becoming overheated and fail. This may not be a problem for inverters which are located in indoor or temperature controlled environments (i.e. air-conditioned enclosed areas). However, wireless sites, are often located outdoors, sometimes in remote areas. Because of this, conventional arrangements do not allow for the inclusion of inversion devices because they are not capable of enduring the elevated temperature levels. In order to maintain the inverter temperature within its operating specifications and prevent it from becoming overexposed to these elevated temperatures, the present invention cools the inverter as it heats up. This is accomplished by at least partially encompassing inverter 116 with a phase changing material (PCM) 118 (see FIG. 2) that is capable of absorbing heat from inverter 116 and the surrounding ambient air. The PCM is comprised initially of a solid material that could have a melting point as low as ice or higher for materials such as wax, salt, and paraffin. The type of solid, and hence its melting point, is selected in part based on the expected operating conditions. However, for an inverter coupled to a fuel cell, as in the present invention, the preferred PCM material is a hydrated salt because of its high phase change endothermic level. The PCM disclosed herein because of its high thermodynamic potential has the capability of absorbing heat from inverter 116 and the surrounding air, essentially serving as a heat sink.

Initially the PCM is in a solid state. However, it is formed of a material having a melting point, such that it can absorb substantial heat, thereby keeping the inverter temperature within operating limits and raising the temperature of the PCM above its melting point such that the material changes state from solid to liquid. For this embodiment, the PCM has a melting point of approximately 27-29 degrees Celsius. When operating conditions change such that the operating temperature proximate the inverter drops, the PCM will dissipate the heat to the surrounding air and cool such that the PCM temperature drops below the melting point and re-solidifies. The exact quantity and type of material for the PCM depends on the temperatures to which the inverter is exposed and the duration of exposure.

The exact layout of inverter 116 and PCM 118 relative to the source of DC 112 (fuel cell) will vary by the application, but for outdoor applications such as site 100, it is preferred that fuel cell 112, inverter 116, and PCM 118 are all contained in cabinets 202 and 204, respectively. However, when these cabinets are placed outdoors, they are not insulated from temperature fluctuations associated with their outdoor environment. Therefore, in order to ensure that inverter 116 is capable of handling temperature fluctuations associated with outdoor operations, especially the elevated temperatures, inverter 116 is at least partially surrounded by the phase changing material 118. Referring to FIG. 2, a first possible embodiment is shown in which inverter 116 is located within cabinet 204, but is at least partially encompassed by a plurality of tubes 206, with each tube 206 containing PCM 118. Though not shown in FIG. 2, it should be understood that these tubes extend into the page. In an alternate embodiment, an inverter is positioned in a cabinet adjacent to source of DC 112 with phase changing material 118 located generally along the walls of the cabinet.

In addition to the back-up power source apparatus disclosed, a method of providing a source of AC from a DC producer is disclosed. This method is better understood with reference to FIGS. 3 and 4, with FIG. 3 showing a general flow diagram for the back-up power source 110, while FIG. 4 shows a more detailed flow diagram relating to the temperature control aspects of inverter 116 and PCM 118.

Referring first to FIG. 3, a back-up source of AC is provided by providing a DC producer 302, such as a fuel cell, that generates DC power and electronically coupling it to an inverter to convert a portion of the DC to AC at step 304. The inverter is provided with a phase changing material that absorbs heat from the inverter and surrounding air, with the temperature of the material rising to a level above its melting point, causing the material to change states from solid to liquid. As previously described, as temperatures drop, the PCM dissipates the heat to the surrounding air and re-solidifies. The remainder of DC is supplied to the DC demand at step 306. Once AC has been generated at step 304, the AC produced is then supplied to the AC demand at step 308. This AC demand, for a telecommunications facility, is typically low load devices, such as tower lights or instrumentation.

Figure 4:
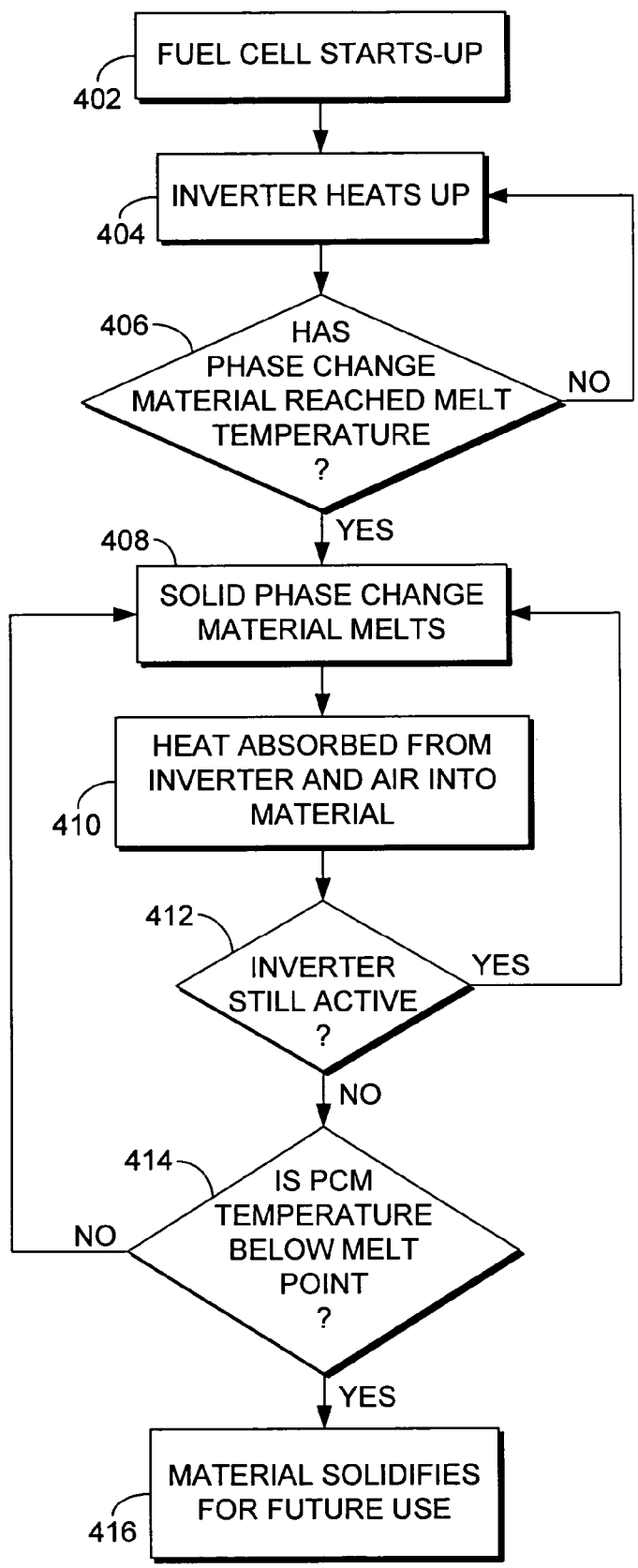
FIG. 4 is a flow diagram showing the process by which the phase changing material changes states in accordance with the present invention.

A more detailed process describing the thermal interaction between the inverter and PCM is shown in FIG. 4. If the power goes offline and back-up power source 110 is required, then a source of direct current (DC), in this case a fuel cell, is started up at step 402. DC, which is generated by the fuel cell, is then sent to an inverter to convert at portion to AC. Through this conversion process the inverter generates heat in step 404. As the inverter puts out heat, the PCM absorbs this heat, thereby raising its temperature. Next, a determination is made at step 406 as to whether or not the PCM has reached its melting point. If it has not reached the melting point, then the PCM will continue to absorb heat. If, however, the PCM has reached the temperature required for melting, then the solid PCM melts at step 408 and continues to absorb heat as possible in step 410.

As the PCM melts and absorbs heat from the inverter and surrounding air, the next step 412 is to determine if the inverter is still active. If it is, then the solid PCM continues to melt as additional heat is generated by the inverter. The PCM can only continue to absorb heat as long as some portion of it is still unchanged, or solid.

Once the change of state is complete, it can no longer absorb any heat. If the inverter is no longer active, then it is no longer generating heat and the determination is made in step 414 as to whether or not the PCM has returned to below the melting point. If it has not, then the PCM continues to melt or remains in the liquid state. However, if the temperature of the PCM has dropped below the melting point, then the material begins to re-solidify at step 416.

Since the substance comprising the PCM has the capability of re-solidifying, the PCM can be re-used and the cycle repeated. This is especially advantageous for use in remote locations in that continuous monitoring of insulating materials and/or replacement thereof is not required daily, but periodically.

While this application of PCM serving as a heat sink for the inverter, with the inverter coupled to a fuel cell, is new and unique, the users of such a system must use caution in placing such a system in certain environments. Specifically, the system should be configured with the appropriate amount of PCM having the desired melting point, such that the PCM will change phases to absorb the heat in order to maintain the inverter at the proper temperature, but not melt prematurely nor completely such that no additional heat absorption occurs. Should this occur, the temperature of the inverter will then begin to rise to unacceptable levels causing the inverter to overheat and fail. For example, if the PCM has a melting point of approximately 27-29 degrees Celsius (80.6-84.2 degrees Fahrenheit) and the operating conditions (ambient air+heat generated by the inverter) are such that the combined temperature is over the melting point of the PCM within a hour of operation and remains at that level for the next 18 hours, then the heat absorption capability of the PCM may not be sufficient for the entire period of time operating above the phase changing material melting point.

This type of situation could occur at an outdoor telecommunications site located in regions of extreme heat, such as a desert area. Such a system with a melting point of approximately 27-29 degrees Celsius (80.6-84.2 degrees Fahrenheit) would be more appropriate for a region where the maximum high temperature is more temperate, say between 85 F and 95 F and for a shorter period of time, such as for only a few hours in the afternoon, as can typically be expected during the summer months in much of the continental United States. This type of operating scenario, would ensure that the PCM would still provide an ample heat sink for the ambient air temperature as well as the heat generated by the inverter.

It will be appreciated by people skilled in the art that the present invention is not limited to what has been particularly shown and described above. Rather, all matter shown in the accompanying drawings or described above is to be interpreted as illustrative and not limiting. Accordingly, the scope of the present invention is defined by the appended claims rather than the foregoing description.

What is claimed is:

1. A power system for meeting alternating current (AC) and direct current (DC) demands at a telecommunications site, comprising:
   a source of alternating current (AC), said source connected to an AC demand and to a DC demand via a rectifier;
   a back-up source of direct current (DC) connected directly to said DC demand; and
   an inverter connected to said back-up source of DC for converting at least a portion of DC to AC for supply to said AC demand, and wherein said inverter is at least partially encompassed by a phase changing material capable of absorbing heat from said inverter and surrounding ambient air.

2. The power system of claim 1 wherein said back-up source of DC is a fuel cell.

3. The power system of claim 2 wherein said fuel cell is supplied with stored hydrogen.

4. The power system of claim 1 wherein said material absorbs heat from said inverter and said surrounding ambient air, thereby raising the temperature of said state changing material above its melting point such that said material changes state from solid to liquid.

5. The power system of claim 4 wherein said changing of state of said material occurs at a temperature of approximately 27-29 degrees Celsius.

6. The power system of claim 1 wherein said inverter is located in a cabinet adjacent to said back-up source of DC with said phase changing material located generally along the inside walls of said cabinet.

7. The power system of claim 1, wherein the DC demand comprises telecommunications equipment.

8. A method for meeting alternating current (AC) and direct current (DC) demands at a site, comprising:
   electronically coupling a source of alternating current (AC) to an AC demand and to a DC demand via a rectifier;
   electronically coupling a back-up source of direct current (DC) directly to said DC demand;
   electronically coupling an inverter to said back-up source of DC to convert at least a portion of DC to AC, said inverter at least partially surrounded with a phase changing material for absorbing heat created by operation of said inverter;
   electronically coupling said inverter to said AC demand;
   providing AC power to said AC demand via said source of AC;
   providing DC power to said DC demand via said source of AC and said rectifier;
   providing AC power to said AC demand via said back-up source of DC and said inverter when said source of AC is not available; and
   providing DC power to said DC demand via said back-up source of DC when said source of AC is not available.

9. The method of claim 8 wherein said back-up source of DC is a fuel cell.

10. The method of claim 9 wherein said fuel cell is supplied with stored hydrogen.

11. The method of claim 8 wherein the heat absorbed by the phase changing material causes a change of state thereof from solid to liquid occurring at a temperature of approximately 27-29 degrees Celsius.

12. The method of claim 8 wherein the site is a wireless telecommunications station.

* * * * *